United States Patent
Fritz et al.

[15] 3,664,027
[45] May 23, 1972

[54] BICYCLE FRAME-SIZE INDICATOR

[72] Inventors: Albert J. Fritz, Wilmette; Rudolph L. Schwinn, Niles, both of Ill.

[73] Assignee: Schwinn Bicycle Company, Chicago, Ill.

[22] Filed: Aug. 12, 1970

[21] Appl. No.: 63,065

[52] U.S. Cl. .................................33/174 R, 33/174, 272/73
[51] Int. Cl. .....................................B62k 17/00, B62k 19/00
[58] Field of Search.........................33/174 D, 174 G, 174 R; 273/73, 58

[56] References Cited
UNITED STATES PATENTS

| 1,909,002 | 5/1933 | Oehlberg | 272/33 |
| 1,820,372 | 8/1931 | Blomquist | 272/33 |
| 3,578,800 | 5/1971 | Dinepi | 272/33 |

*Primary Examiner*—Leonard Forman
*Assistant Examiner*—Paul G. Foldes
*Attorney*—Davis, Lucas, Brewer & Brugman

[57] ABSTRACT

Measuring device for accurately determining under use conditions the proper size bicycle frame for any rider.

4 Claims, 3 Drawing Figures

Patented May 23, 1972

3,664,027

Inventors:
Albert J. Fritz
Rudolph L. Schwinn
By:
Davis, Lucas, Brewer & Brugman
Attys.

BICYCLE FRAME-SIZE INDICATOR

BACKGROUND OF THE INVENTION

1. Field of the Invention

This invention relates in general to bicycles, and more particularly to novel means for ascertaining the proper size of bicycle frame for any particular rider.

2. Description of the Prior Art

Bicycles of any given style and design normally are manufactured with several different sizes of frames. In selecting the proper size of frame for a potential bicycle rider, it has been customary first to go by the age of the person and then to have that prospective rider sit on or try bicycles with different sizes of frames, with additional adjusting and trying of seat height of each of those bicycles. This normally is a time-consuming procedure, and even after a decision has been reached, frequently results in lingering doubts of its accuracy in the mind of the customer.

SUMMARY OF THE INVENTION

This invention enables simple and accurate selection under use conditions of the proper size of bicycle frame for a prospective rider by providing, in combination with a stationary support having rotatable pedals, an adjustable measuring device comprising a stationary index on the support, a seat post carrying a saddle at its upper end to support a rider in position to rotate the pedals and slidably mounted on the support for vertical adjustable movement relative thereto, quick release clamping means for securing the seat post in selected adjusted position, and a movable index operable with the seat post to cooperate with the stationary index to indicate the bicycle frame size range within which any adjusted saddle position falls.

DESCRIPTION OF THE PREFERRED EMBODIMENT

Figure 1:
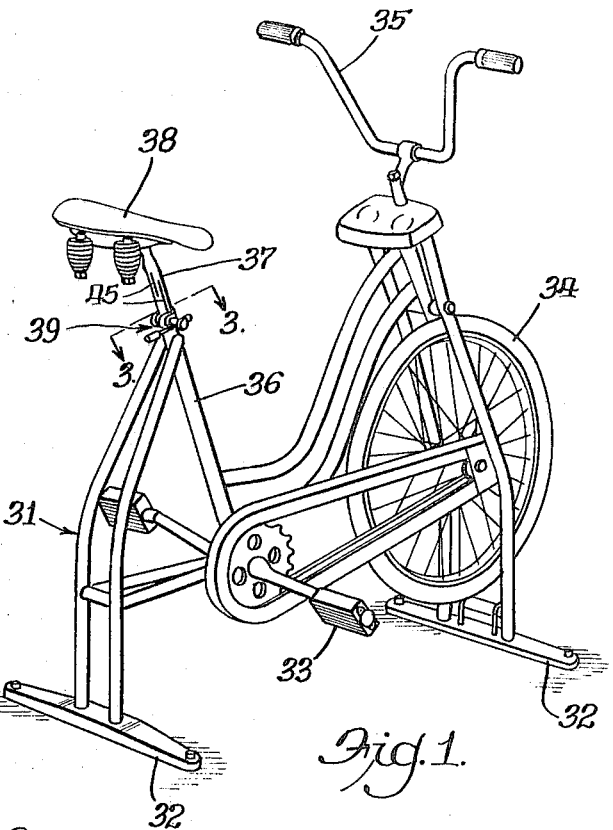
FIG. 1 is a perspective view of a device embodying the features of the invention.

Referring more particularly to FIG. 1, the bicycle frame-size indicator of the invention is shown as being incorporated in a stationary bicycle-type of exercising device having a frame, indicated generally by reference numeral 31, comprising a support mounted on floor-engaging feet 32 and having rotatable pedals 33 mounted thereon in well known manner. If desired, front wheel means 14 also may be rotatably mounted on the frame 31 for rotation by the pedals 33, and a handle bar 35 adjustably disposed at the forward end of the frame or stationary support 31.

The support or frame 31 includes a tube 36 extending upwardly and rearwardly from a point adjacent the center of rotation of the usual bicycle crank carrying the pedals 33 for slidably and telescopingly receiving a seat post 37 having a saddle 38 mounted on its upper end in well known manner.

Figure 3:
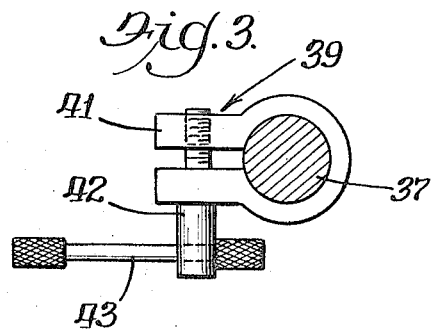
FIG. 3 is a horizontal section taken substantially on the line 3—3 of FIG. 1.

Quick-release clamping means 39 is provided for securing the seat post 37 in selected adjusted position which may take the form of a clamp 41 (FIG. 3) on the support or frame 31 adapted to clampingly grasp the seat post 37 when tightened by means of a bolt 42 and its handle 43. With such arrangement it is a simple matter to adjust the position of the saddle 38 to that best suited to support any particular rider for operating the pedals 33 most comfortably when seated on the saddle. This saddle adjustment then is used to provide a determination of the proper size of bicycle frame for that particular rider.

Figure 2:
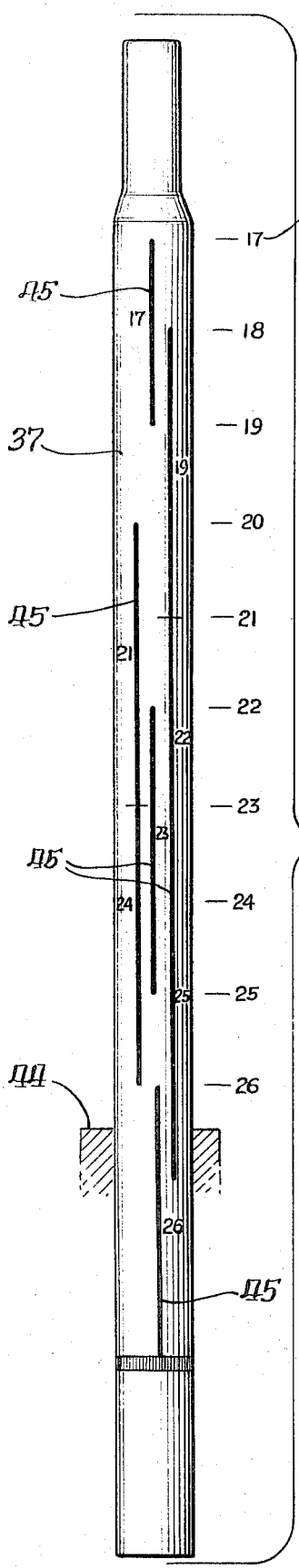
FIG. 2 is an elevational view showing details of the indices.

To this end, the upper edge of the seat post 37 or the clamp 41 thereon is employed as a stationary index, as indicated at 44 in FIG. 2, which cooperates with a movable index on the seat post 37 to indicate the bicycle frame-size range within which any adjusted saddle position falls. The standard bicycle frame sizes being from 17 to 26 inches, as is well understood in the art, this movable index in the illustrated embodiment of the invention preferably comprises a plurality of vertically extending indices 45 (FIG. 2) to include those sizes. Since the seat post employed with each different size of frame customarily has its own range of adjustment, the individual indices 45 preferably comprise vertically extending lines respectively coincident with such associated seat post ranges of adjustment. As a result, adjacent indices 45 overlap, so they have been displaced horizontally relative to, or spaced from, each other as illustrated in FIG. 2, and each of these lineal indices 45 is identified by its frame size number. In addition to the lineal indices 45, or in substitution therefor, the seat post 37 may be provided with numerical frame-size indices 46 with or without horizontal reference lines. The indices 45, 46 may be applied to the seat post 37 in any desired manner, as by being die-rolled therein.

In any event, the indices 45 and/or 46 comprise a vertically disposed scale of bicycle frame sizes on the adjustable seat post 37 which cooperate with the stationary index 44 to indicate the bicycle frame-size range within which any adjusted position of the saddle 38 relative to the rotatable pedals 33 falls. It will be appreciated, of course, that the vertical overlapping of the lineal indices 45 will result in many instances, as in that illustrated in FIG. 2, in the adjusted position of the saddle and the seat post 37 being indicated by the stationary index 44 as offering a choice of selection of appropriate bicycle frame sizes, as either a 25 or 26 inch frame in FIG. 2. This exemplifies the advantage, in addition to that of facilitating determination of the most comfortable distance between saddle and pedals with minimum effort, that the instant invention has in giving the purchaser a choice of appropriate frame sizes, which is particularly important in the case of a growing child.

We claim:

1. A bicycle frame-size gauge providing an adjustable measuring device for determining under use conditions the proper size of bicycle frame for a rider in combination with a stationary support having rotatable pedals, comprising a stationary index on said support, a saddle, a seat post carrying said saddle at its upper end to support a rider in position to rotate said pedals and slidably mounted on said support for vertically adjustable movement relative thereto, quick-release clamping means for securing said seat post in selected adjusted position to the stationary support and an index on and movable with said seat post to cooperate with said stationary index to indicate the bicycle frame-size range within which any adjusted saddle position falls comprising a set of vertically extending lines each corresponding to a saddle adjustment range for a different size of bicycle frame.

2. A device according to claim 1, wherein portions of adjacent said indices overlap vertically and are displaced horizontally relative to each other to prevent superposing thereof.

3. In a device according to claim 2, numerical indicia identifying the bicycle frame sizes of said vertically extending indices.

4. A device according to claim 3, wherein said movable index is die-rolled into said seat post.

* * * * *